United States Patent [19]

Nagasaki et al.

[11] Patent Number: 5,138,458
[45] Date of Patent: Aug. 11, 1992

[54] ELECTRONIC CAMERA APPARATUS CAPABLE OF PROVIDING WIDE DYNAMIC RANGE IMAGE SIGNAL

[75] Inventors: Tatsuo Nagasaki, Yokohama; Takeshi Mori; Toru Wada, both of Tokyo, all of Japan

[73] Assignee: Olympus Optical Co., Ltd., Tokyo, Japan

[21] Appl. No.: 628,577

[22] Filed: Dec. 17, 1990

[30] Foreign Application Priority Data

| Dec. 22, 1989 | [JP] | Japan | 1-334508 |
| Feb. 14, 1990 | [JP] | Japan | 2-31491 |
| Oct. 9, 1990 | [JP] | Japan | 2-271520 |

[51] Int. Cl.$^5$ .................................................. H04N 5/30
[52] U.S. Cl. .................................... 358/209; 358/909; 358/137; 358/213.18; 358/213.16
[58] Field of Search ............... 358/209, 909, 213.18, 358/213.16, 213.15, 29 C, 36, 37, 166, 167, 137

[56] References Cited

U.S. PATENT DOCUMENTS

| 4,580,168 | 4/1986 | Levine | 358/213.16 |
| 4,779,137 | 10/1988 | Tojo | 358/213.19 |
| 4,839,729 | 6/1989 | Ando | 358/213.15 |
| 4,841,366 | 6/1989 | Katagiri | 358/36 |
| 4,849,813 | 7/1989 | Hirao | 358/137 |
| 4,868,645 | 9/1989 | Kobayashi | 358/213.16 |
| 4,884,142 | 11/1989 | Suzuki | 358/213.19 |

FOREIGN PATENT DOCUMENTS

| 2060581 | 12/1970 | Fed. Rep. of Germany . |
| 2935328 | 8/1979 | Fed. Rep. of Germany . |
| 3438449 A1 | 10/1984 | Fed. Rep. of Germany . |
| 3517737 A1 | 5/1985 | Fed. Rep. of Germany . |
| 3517761 A1 | 5/1985 | Fed. Rep. of Germany . |

Primary Examiner—James J. Groody
Assistant Examiner—Sherrie Hsia
Attorney, Agent, or Firm—Frishauf, Holtz, Goodman & Woodward

[57] ABSTRACT

An electronic camera apparatus provides an image pickup signal to serve an image display by an image monitor. An image pickup section has at least a solid-state image pickup element and generates an image signal by electrically picking up an image of a target object to be photographed. A control section time-divisionally and repeatedly executes image pickup processing of the target object a plurality of times by using the image pickup section and a read operation of the image signal obtained by the image pickup processing. An accumulative addition section sequentially performs accumulative addition of the image signals repeatedly read from the image pickup section by the control section. A processing section processes the image signal obtained by the accumulative addition section upon sequential, accumulative addition so as to allow the image signal to be used for an image display by the image monitor.

35 Claims, 8 Drawing Sheets

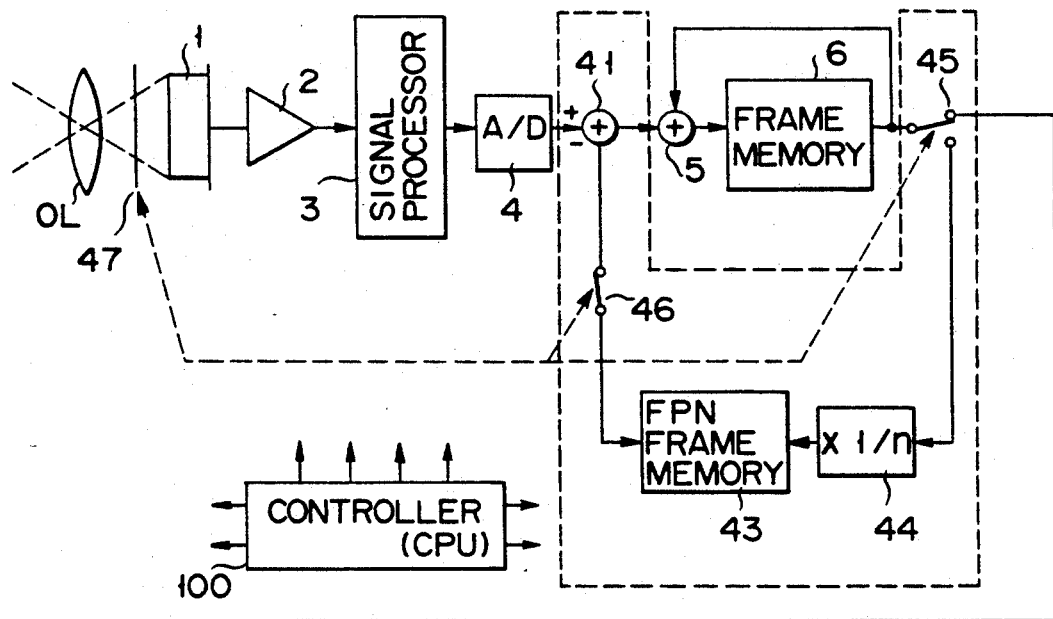
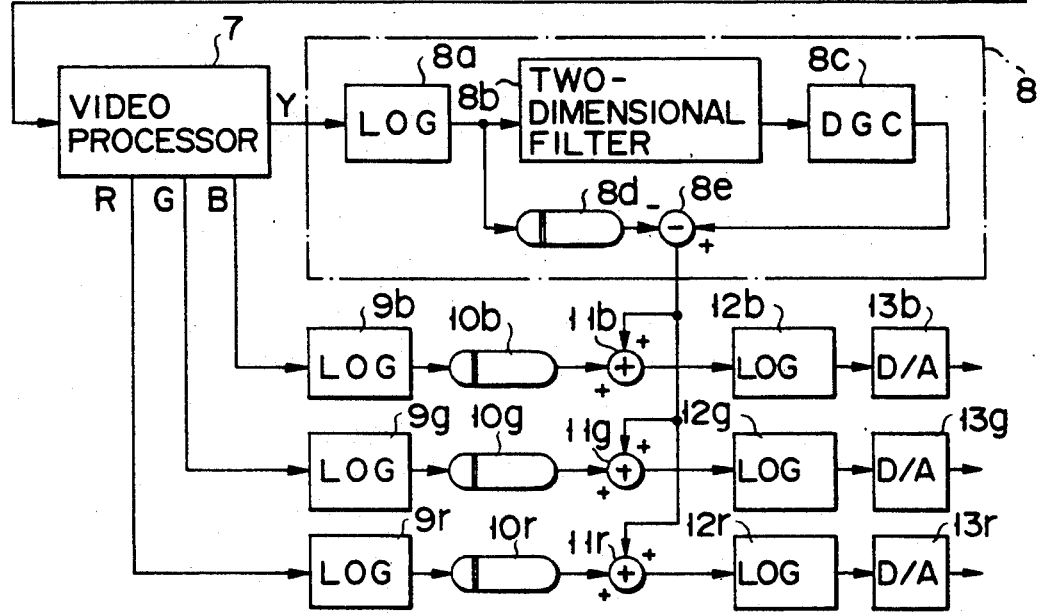
FIG. 14
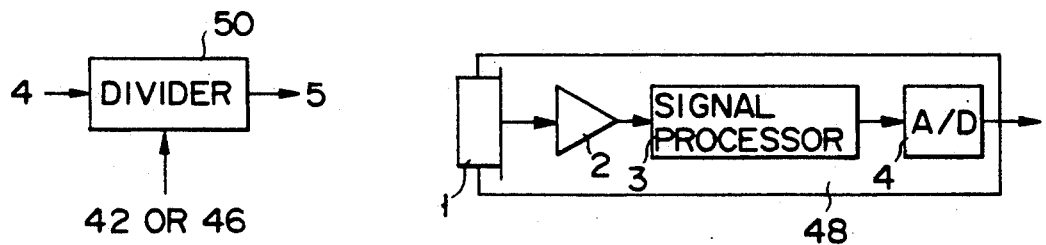
FIG. 15A    FIG. 15B

ELECTRONIC CAMERA APPARATUS CAPABLE OF PROVIDING WIDE DYNAMIC RANGE IMAGE SIGNAL

BACKGROUND OF THE INVENTION

1. Field of the Invention

The present invention generally relates to an electronic camera apparatus and, more particularly, to an electronic camera apparatus which can effectively pick up an image of a target object (to be photographed) having a wide dynamic range and allows it to be displayed on an external image monitor.

2. Description of the Related Art

Various types of solid-state image pickup elements, such as CCD image sensors and MOS type image sensors, have recently been developed. Consequently, various types of electronic cameras for electronically picking up an image of a target object by using these solid-state image pickup elements have been developed as, e.g., video cameras and electronic still cameras. An electronic camera of this type is designed to record an image signal (image pickup signal) of a target object, electronically picked up by a solid-state image pickup element, in, e.g., a magnetic recording medium such as a so-called video tape or a floppy disk, or an IC memory card and to allow it to be displayed on an image monitor such as a TV receiver.

The dynamic range of a video signal which can be displayed on an image monitor of the TV receiver or the like is 40 dB at best. For this reason, the image pickup capacity (dynamic range) of a solid-state image pickup element is generally set to be about 50 dB.

In contrast to this, the dynamic range of a target object to be picked up by the solid-state image pickup element (electronic camera) often reaches 80 dB. That is, the dynamic range (signal level width) of a target object often greatly exceeds a dynamic range in which an image display can be performed by an external image monitor, and image pickup processing can be performed by a solid-state image pickup element.

When a target object having such a wide dynamic range is to be electronically picked up by the solid-state image pickup element without any modifications, saturation of the solid-state image pickup element occurs at a high signal level portion (high-brightness portion), thus causing so-called white omissions. In contrast to this, if this saturation is suppressed, a low signal level portion (low-brightness portion) suffers from underexposure, thus causing so-called blackening. That is, a signal component which falls outside the dynamic range of a solid-state image pickup element or an image monitor cannot be picked up or displayed.

As described above, a target object often has a dynamic range wider than that of a solid-state image pickup element. In the conventional technique, if such a target object is electronically picked up by the solid-state image pickup element without any modifications, object data at a high-level or low-level portion is impaired. More specifically, if a target object having a wide dynamic range is electronically picked up by a solid-state image pickup element, the dynamic range of the target object is restricted by the dynamic range of the solid-state image pickup element or the image monitor. As a result, only an image signal (video signal) having a limited dynamic range can be obtained. Especially in a solid-state image pickup element, an essential problem is posed, wherein vertical stripes are generated on a display screen due to fixed pattern noise.

SUMMARY OF THE INVENTION

It is, therefore, an object of the present invention to provide a new and improved electronic camera apparatus capable of providing a wide dynamic range image signal in which a target object having a dynamic range exceeding the dynamic range of a solid-state image pickup element arranged in an image pickup section can be effectively picked up so as to perform an image display by using an image monitor without causing inconvenience such as so-called white omissions or blackening, thus providing highly practical applications.

It is another object of the present invention to provide an electronic camera apparatus having high practicability in which an image of a target object having a dynamic range exceeding the dynamic range of a solid-state image pickup element arranged in an image pickup section is effectively picked up so as to perform an image display by using an image monitor without causing inconvenience such as so-called white omissions or blackening, or vertical stripes caused by fixed pattern noise.

According to a first aspect of the present invention, there is provided an electronic camera apparatus for providing an image pickup signal to serve an image display by an image monitor, the apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using the image pickup means and a read operation of the image signal obtained by the image pickup processing;

accumulative addition means for sequentially performing accumulative addition of the image signals repeatedly read from the image pickup means by the control means; and processing means for processing the image signal obtained by the accumulative addition means upon sequential, accumulative addition so as to allow the image signal to be used for an image display by the image monitor.

According to a second aspect of the present invention, there is provided an electronic camera apparatus for providing an image pickup signal to serve an image display by an image monitor, the apparatus comprising:

image pickup means, having at least a solid-state image pickup element, for generating an image signal by electronically picking up an image of a target object to be photographed;

control means for repeatedly executing image pickup processing of the target object a plurality of times within one period of an image display of the image monitor by using the image pickup means and a read operation of the image signal obtained by the image pickup processing;

accumulative addition means for sequentially performing accumulative addition of the image signals, repeatedly read from the image pickup means by the control means, a plurality of time within one period of an image display by the image monitor; and processing means for processing the image signal obtained by the accumulative addition means upon sequential, accumulative addition so as to allow the image signal to be used for an image display by the image monitor.

In addition, according to the first and second aspects, after the dynamic rage of the image signal, obtained by accumulative addition, is compressed, the image signal is output to the image monitor.

That is, according to the first and second aspects, an exposure time during which a target object is exposed by the solid-state image pickup element is shortened by repeatedly performing image pickup processing of the target object by the image pickup means having the solid-state image pickup element and a read operation of the obtained image signal at high speed. With this operation, saturation of the solid-state image pickup element with respect to a high-level signal is prevented. The image signals obtained by short-time exposure are repeatedly read and accumulatively added at high speed to obtain an image signal having a widened dynamic range, thus substantially obtaining an image signal having a wide dynamic range equivalent to the dynamic range of the target object.

According to such an arrangement, since exposure of a target object by means of the solid-state image pickup element and a read operation of the resultant image signal are repeatedly performed at high speed within an image display period, and accumulative addition of the image signals is performed, the dynamic range of the image signal obtained by accumulative addition can be widened by an amount corresponding to the number of times of accumulative addition, while the dynamic range of each image signal is suppressed to a small value.

As a result, even a target object having a wide dynamic range relative to the dynamic range of a solid-state image pickup element can be effectively picked up to obtain an image signal having a wide dynamic range without being limited by the dynamic range of the solid-state image pickup element.

With this processing, this wide dynamic range image signal is subjected to dynamic range compression in accordance with the dynamic range of the image monitor, and is used for an image display. Therefore, an image display can be performed without causing any inconvenience such as white omissions or blackening.

According to a third aspect of the present invention, there is provided an electronic camera apparatus for providing an image pickup signal to serve an image display by an image monitor, the apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using the image pickup means and a read operation of the image signal obtained by the image pickup processing;

reducing means for reducing a fixed pattern noise signal included in the image signals repeatedly read from the image pickup means by the control means;

accumulative addition means for sequentially performing accumulative addition of the image signals in which the fixed pattern noise signal is reduced by the reducing means; and processing means for processing the image signal obtained by the accumulative addition means upon sequential, accumulative addition so as to allow the image signal to be used for an image display by the image monitor.

In addition, according to the third aspect, after the dynamic range of the image signal, obtained by accumulative addition, is compressed, the image signal is output to the image monitor.

That is, according to the third aspect, an exposure time during which a target object is exposed by the solid-state image pickup element is shortened by repeatedly performing image pickup processing of the target object by the image pickup means having the solid-state image pickup element and reading of the obtained image signal from the element at high speed. With this operation, saturation of the solid-state image pickup element with respect to a high-level signal is prevented. The image signal obtained by short-time exposure is repeatedly read and accumulatively added at high speed to obtain an image signal having a widened dynamic range, thus substantially obtaining an image signal having a wide dynamic range equivalent to the dynamic range of the target object without generating vertical stripes on a display screen.

According to such an arrangement, since exposure (image pickup processing) of a target object by means of the solid-state image pickup element and a read operation of the resultant image signal from the element are repeatedly performed at high speed, and accumulative addition of the image signals is performed while fixed pattern noise therein is reduced, the dynamic range of the image signal obtained by accumulative addition can be widened by an amount corresponding to the number of times of accumulative addition, while the dynamic range of each image signal is suppressed to a small value.

As a result, even a target object having a wide dynamic range relative to the dynamic range of a solid-state image pickup element can be effectively picked up to obtain an image signal having a wide dynamic range without being limited by the dynamic range of the solid-state image pickup element.

With this processing, this wide dynamic range image signal is subjected to dynamic range compression in accordance with the dynamic range of the image monitor, and is used for an image display. Therefore, an image display can be performed without causing any inconvenience such as white omissions or blackening, or vertical stripes caused by fixed pattern noise.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 15B show an electronic camera apparatus according to the present invention, in which:

FIG. 1 is a block diagram showing a schematic arrangement of the first embodiment of the present invention;

FIG. 2 is a graph for explaining an S/N ratio increasing effect obtained by accumulative addition of image signals;

FIG. 3 is a graph showing a relationship between the dynamic range of an image signal and the dynamic range of an image monitor;

FIG. 4 is a block diagram showing an arrangement of a two-dimensional filter used in the embodiment shown in FIG. 1;

FIG. 5 is a block diagram showing an arrangement of a dynamic range/gain controller used in the embodiment shown in FIG. 1;

FIG. 6 is a block diagram showing an arrangement of a main part of a modification of the dynamic range/gain controller;

FIG. 7 is a circuit diagram for explaining a modification for dynamic range adjustment;

FIG. 8 is a block diagram showing a schematic arrangement of the second embodiment of the present invention;

FIG. 9 is a block diagram showing a schematic arrangement of the third embodiment of the present invention;

FIG. 10 is a block diagram showing an arrangement of a digital converter;

FIG. 11 is a graph showing the nonlinear conversion characteristics of the digital converter in FIG. 10;

FIG. 12 is a graph showing the characteristics of a logarithmic amplifier used to logarithm-transform a color difference signal having positive and negative polarities;

FIG. 13 is a block diagram showing a schematic arrangement of the fourth embodiment of the present invention;

FIG. 14 is a block diagram showing a schematic arrangement of the fifth embodiment of the present invention; and FIGS. 15A and 15B are block diagrams for explaining a main part of a modification for reducing noise.

DETAILED DESCRIPTION OF THE PREFERRED EMBODIMENTS

Figure 1:
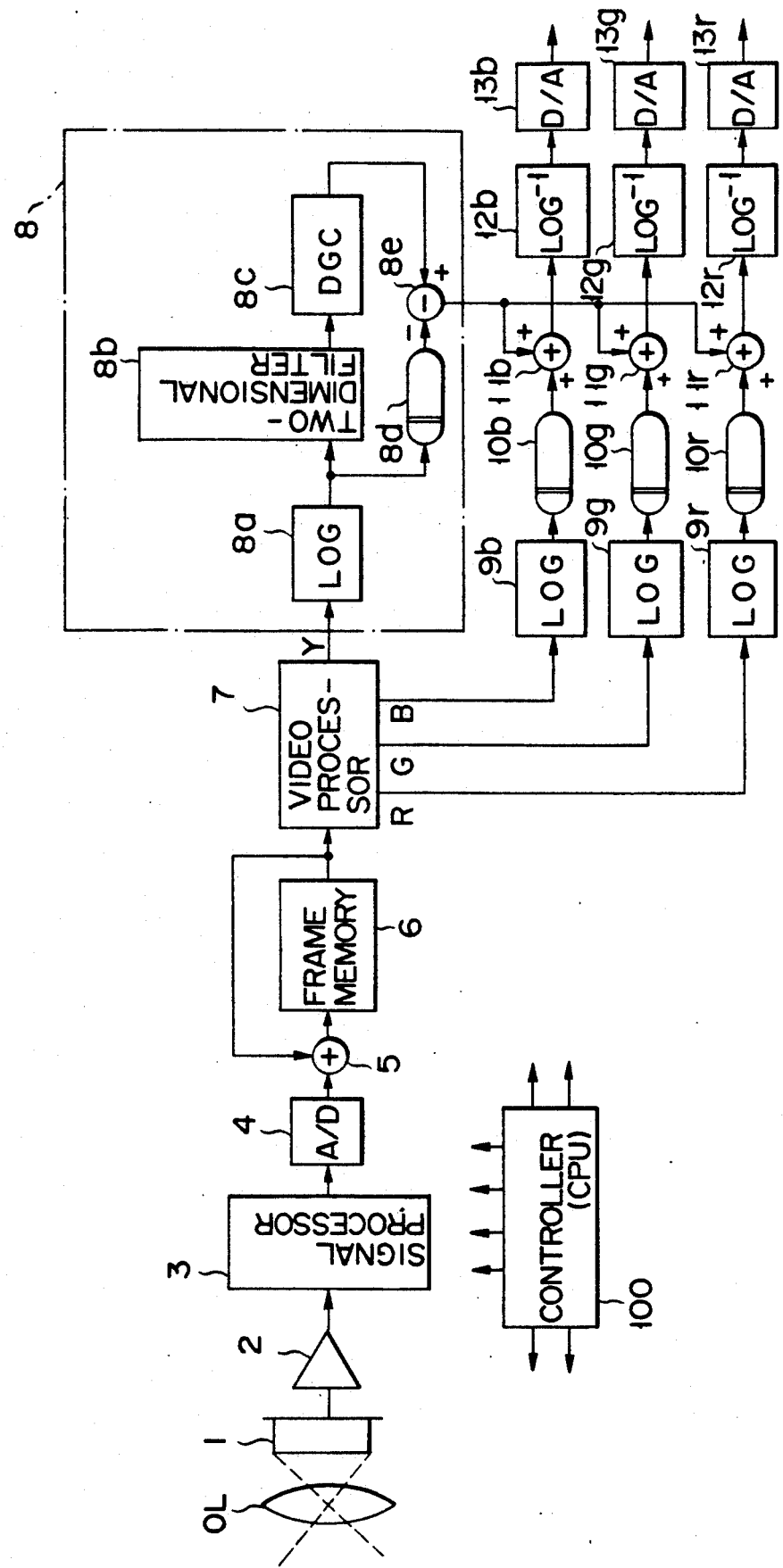

Reference will now be made in detail to the presently preferred embodiments of the invention as illustrated in the accompanying drawings, in which like reference characters designate like or corresponding parts throughout the several drawings.

First, a first embodiment of the present invention will be described with reference to FIGS. 1 to 7.

FIG. 1 is a block diagram showing a schematic arrangement of a main part of an electronic camera apparatus to be applied to a video movie camera according to the first embodiment of the present invention. Reference numeral 1 denotes a solid-state image pickup element for electronically picking up an image of a target object (to be photographed) through an optical lens OL. The solid-state image pickup element 1 includes a plurality of photoelectric conversion portions constituted by, e.g., photodiodes as pixels, basically arranged in the form of a matrix. The solid-state image pickup element 1 is driven by a controller (a CPU and its peripheral circuit) 100, having predetermined control functions including an image pickup control function, so as to perform exposure (image pickup operation) by generating signal charges corresponding to the light amount of the target object in the respective photoelectric conversion portions. Pixel signals corresponding to the signal charges generated in the respective photoelectric conversion portions are sequentially read by the controller 100 to obtain an image signal electrically picked up by the solid-state image pickup element 1.

In this embodiment, as the solid-state image pickup element 1, an AMI (amplifier type MOS imager) capable of reading an image signal of the target object, electronically picked up, at high speed is used. An image pickup operation of the target object by means of the solid-state image pickup element 1 and a read operation of the image signal picked by the element 1 are repeated by the controller 100 a plurality of times at high speed within a period of image display. Each image signal read from the solid-state image pickup element 1 at high speed is amplified to a predetermined signal level by a preamplifier 2 and is subjected to clipping and the like in a signal processor 3. Subsequently, the image signals are sequentially converted into digital codes, e.g., 12-bit signals, by an A/D converter 4.

In a conventional apparatus, in image pickup processing of a target object by a solid-state image pickup element, an image pickup operation and a read operation of an image signal are performed once per, e.g., field period (17 msec) in accordance with an image period in an external image monitor. In this embodiment, however, the solid-state image pickup element 1 is driven by the controller 100 at high speed to perform an image pickup operation and a read operation of an image signal repeatedly, e.g., 10 times, within one field period.

The image signals repeatedly read from the solid-state image pickup element 1 at high speed in this manner are sequentially converted into digital codes, as described above.

The image signals as digital codes are sequentially stored in a frame memory 6 through an adder 5 in units of frames. The adder 5 adds the image signals stored in the frame memory 6 to subsequent one-frame image signals sequentially and repeatedly read from the solid-state image pickup element 1, and rewrites them in the frame memory 6, thus performing accumulative addition of the image signals, repeatedly read as described above, in the frame memory 6. Such an accumulative addition of image signals is time-divisionally performed a plurality of times within the above-mentioned image display period, e.g., 10 times within one field period, thereby widening the dynamic range of the image signal.

In this electronic camera apparatus, electronic image pickup processing of a target object by means of the solid-state image pickup element 1 is repeated a plurality of times (e.g., 10 times) within a image display period (one field), as described above, and hence each object exposure time is set to be sufficiently short. The amount of signal charge corresponding to an object light amount is increased in proportion to an exposure time. For this reason, when the exposure time is set to be short as described above, even if the dynamic range of the target object is much wider than that of the solid-state image pickup element 1, exposure can be performed without causing saturation of the solid-state image pickup element 1. That is, exposure can be performed without causing saturation at a high-brightness portion of the target object. However, since each exposure time is short, an exposure amount with respect to a low-brightness portion of the target object becomes insufficient accordingly. In practice, this poses no significant problems because accumulative addition is performed a plurality of times as will be described later.

By repeatedly performing accumulative addition of such image signals a plurality of times within the above-mentioned image display period (one field), the level of the image signal is increased to a degree corresponding to the number of times of the accumulative addition is performed, and the dynamic range is substantially widened. Assume that an image signal is repeatedly read n times within, e.g., one field of image display, and accumulative addition thereof is performed. In this case, the dynamic range of the image signal obtained by accumulative addition is increased to n times that of each image signal.

Figure 2:
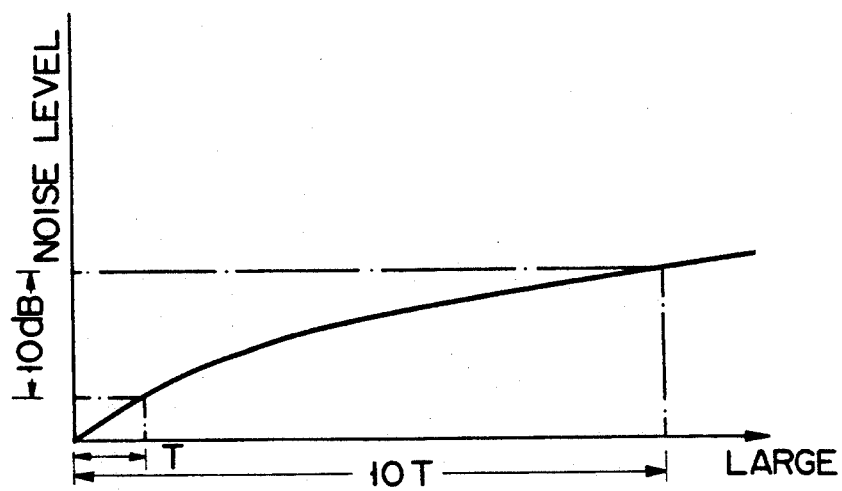

Note that a random noise component such as a dark current included in an image signal during an object exposure operation by the solid-state image pickup element 1 are increased as a function of an exposure time in accordance with a square root function. For example, if the exposure time is shortened to (1/n), the noise level is decreased to $(1/\sqrt{n})$, as shown in FIG. 2.

More specifically, if the exposure time is shortened to (1/10), the noise level is decreased to $(1/\sqrt{10})$. That is, a dynamic range improving effect corresponding to 10 dB can be expected. In addition, an increase in such a noise component due to above-described accumulative addition of image signals is small, e.g., $\sqrt{n}$ times for n accumulative additions, because the noise component itself has random characteristics. Therefore, the dynamic range of an image signal accumulatively added n times is widened to $\sqrt{n} \times \sqrt{n}$ times, i.e., n times.

Owing to the above-described high-speed repetitive reading of the image signals from the solid-state image pickup element 1 which electronically picks up the image of the target object, and accumulative addition of the image signals by means of the frame memory 6 and the adder 5, the level of the image signal picked up within the dynamic range of the solid-state image pickup element 1 can be increased, thus widening the dynamic range.

In other words, when an image signals picked up within the dynamic range of the solid-state image pickup element 1 are accumulatively added n times, the dynamic range can be widened to n times. This means that a target object having a large brightness level width, i.e., a dynamic range wider than that of the solid-state image pickup element 1 is effectively picked up (image pickup processing) upon compression of the dynamic range by short-time exposure and widening of the dynamic range by accumulative addition with high-speed read operations. Therefore, by effectively using the solid-state image pickup element 1 having a dynamic range of, e.g., 50 dB, an object having a dynamic range of 80 dB can be picked up (image pickup processing) to obtain an image signal having a dynamic range of 80 dB.

In addition, image pickup processing of a target object having such a wide dynamic range can be performed by simply changing the driving conditions of the solid-state image pickup element 1 as described above, and providing a means for performing accumulative addition of image signals repeatedly read from the element 1 at high speed. Therefore, such image pickup processing can be very easily performed in terms of hardware. That is, the dynamic range of a picked image signal can be widened very easily and effectively.

Upon reception of the image signal whose dynamic range is widened upon accumulative addition as described above, a video processor 7 separates/extracts a luminance signal component Y from the image signal, and, at the same time, separates the image signal into three primary color components R, G, and B. A dynamic range control circuit 8, which receives the luminance signal component Y, obtains a compression coefficient for compression-converting the dynamic range (80 dB in the above-described case) of the image signal into the dynamic range (e.g., 40 dB) of an external image monitor (e.g., a TV receiver).

Assume that an image signal having a wide dynamic range is image-displayed by using an image monitor having a dynamic range as narrow as 40 dB. In this case, if the offset is set to "0", only a low range of 40 dB of the image signal can be displayed, as indicated by a curve A in FIG. 3, while white omissions are produced in a high-luminance portion due to saturation. In contrast to this, if the offset is set to be a negative value to match the high-luminance portion with the maximum display level of the image monitor, only a high range of 40 dB of the image signal can be displayed, as indicated by a curve B, in FIG. 3. In this case, the low-luminance portion of the image signal is blackened.

Figure 3:
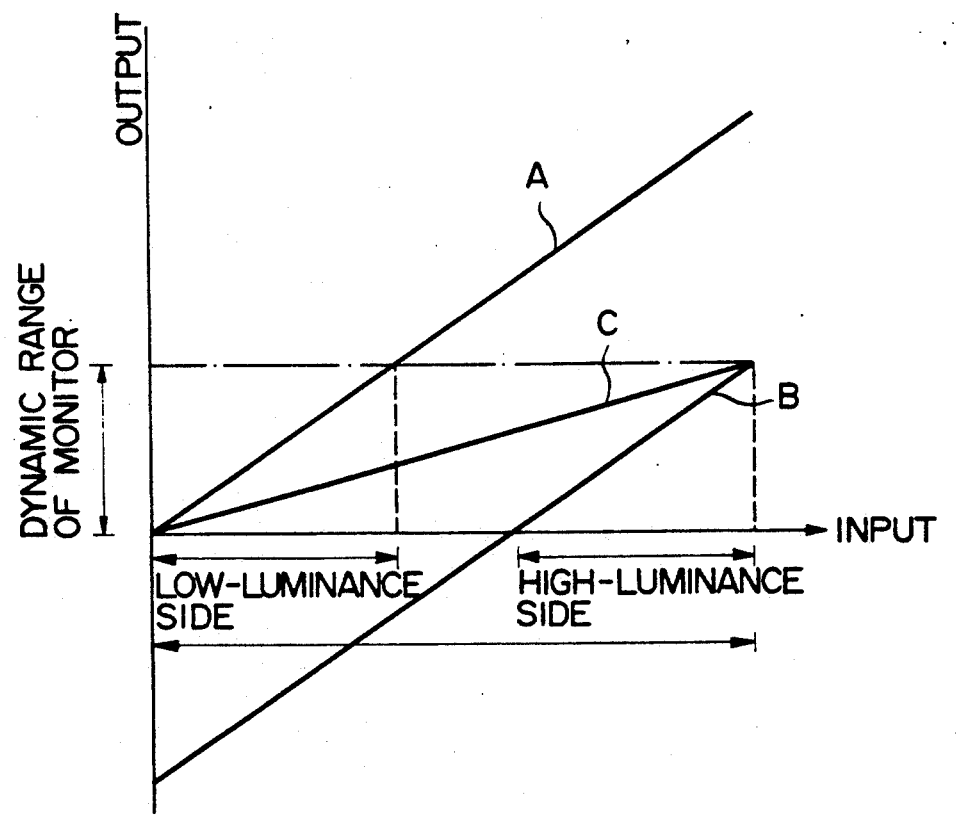

For this reason, as indicated by a curve C in FIG. 3, a compression coefficient corresponding to the dynamic range of the image signal is obtained by the dynamic range control circuit 8 so as to compress the dynamic range of the image signal to eliminate the above-mentioned inconvenience and to display the image signal throughout the entire dynamic range on the image monitor.

In this embodiment, in order to easily and effectively compress the dynamic range of an image signal (separated into the three primary color components R, G, and B), the three primary color components R, G, and B separated from the image signal, and the luminance signal component Y are respectively subjected to logarithmic transformation, and the signal which underwent dynamic range control is subjected inverse logarithmic transformation to restore the signal to the original signal form.

As this technique of dynamic range control, a technique disclosed in U.S. Pat. No. 4,926,247 issued to the present applicant can be used without any modifications, and hence its description will be incorporated here. For this reason, an outline of this dynamic control will be briefly described below.

Figure 4:
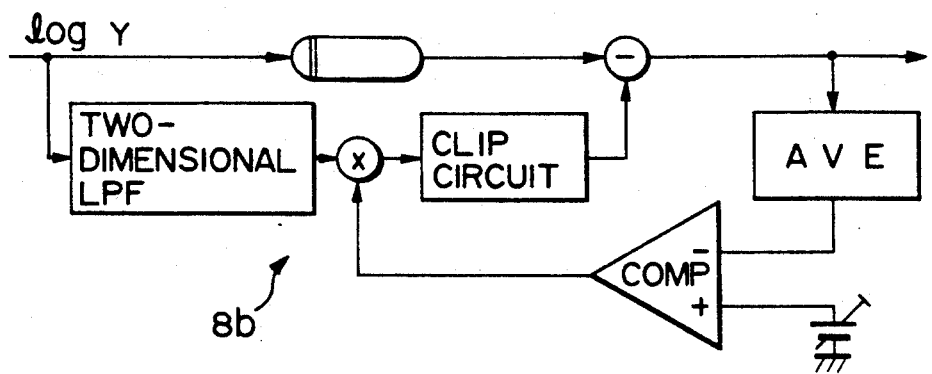

The dynamic range control circuit 8 fetches the luminance signal component Y upon logarithmic transformation thereof through a logarithmic amplifier 8a, and removes an nonuniform illuminance component from the converted signal component through a two-dimensional filter 8b having an arrangement shown in, e.g., FIG. 4. For example, as shown in FIG. 4, this two-dimensional filter 8b removes the nonuniform illuminance component by correcting a luminance signal, obtained through a two-dimensional LPF (low-pass filter), in accordance with a difference (an output from a comparator COMP) between an average level of the luminance signal, obtained by an average value circuit (AVE), and a reference level, clipping the luminance signal by using a clip circuit CLIP, and subtracting it from the luminance signal component.

Figure 5:
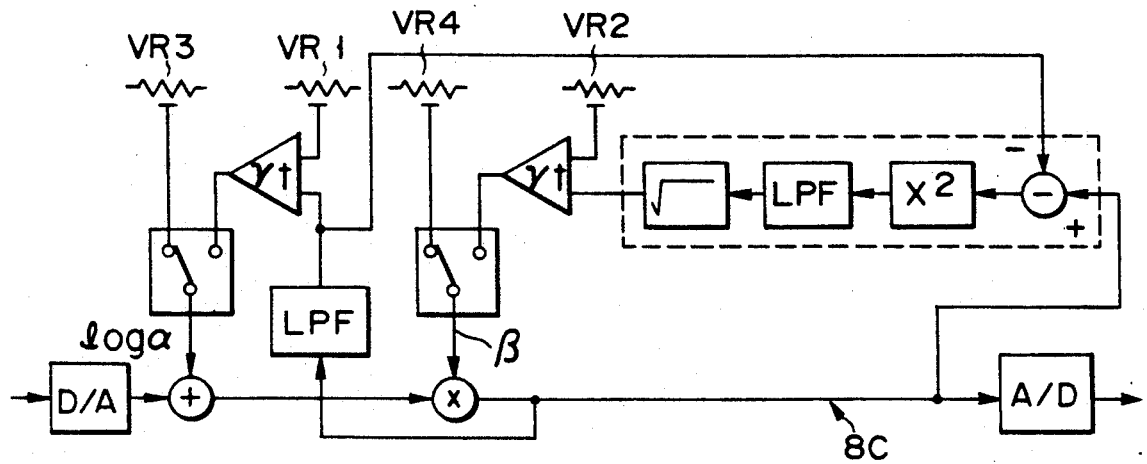

The signal obtained by removing the nonuniform illuminance component from the luminance signal component through the two-dimensional filter 8b is input to a dynamic range/gain controller (DGC) 8c having an arrangement shown in, e.g., FIG. 5, thus obtaining an output log$\alpha Y^\beta$ (where $\alpha$ is the gain adjustment coefficient, and $\beta$ is the dynamic range adjustment coefficient) for matching the dynamic range of the luminance signal component Y with the dynamic range of the image monitor. Although D/A and A/D converters are respectively arranged at the input and the output in FIG. 5, similar processing may be performed by a digital circuit system to omit them.

Figure 6:
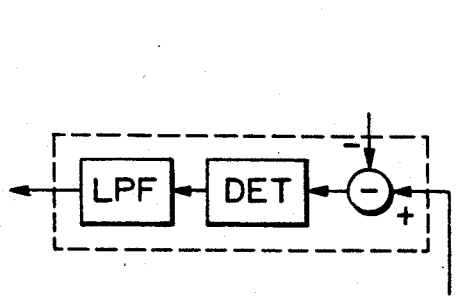

Note that even if a circuit portion enclosed by a dotted line in FIG. 5 is simplified as indicated by, e.g., FIG. 6, the same output as that obtained before simplification can be obtained. A ratio log($\alpha Y^\beta$/Y) of log$\alpha Y^\beta$ to the luminance signal component logY is obtained by a subtracter 8$e$ as a compression coefficient indicating a degree of dynamic range compression.

The DGC 8$c$ performs feedback control to keep a standard deviation of a one-frame component (or a portion) of a luminance signal constant. That is, the DGC 8$c$ is designed to feed back an amplified error between an average value of a luminance signal and a gain reference voltage to an adder so as to adjust its gain such that the average value of the luminance signal coincides with the gain reference voltage. With this operation, the dynamic range is adjusted to a predetermined value. Therefore, the ratio log($\alpha Y^\beta$/Y) of the output log$\alpha Y^\beta$, from the DGC 8$c$ whose dynamic range is set to be the predetermined value in this manner, to the luminance signal component logY can be obtained as a compression coefficient indicating a specific degree of compression of an image signal, picked up (image pickup processing) in the above-described manner, to which its dynamic range can be matched with the dynamic range of an external image monitor.

The three primary color components R, G, and B of the image signal converted by and output from the video processor 7 are respectively logarithm-transformed into logR, logG, and logB through logarithmic amplifiers 9$r$, 9$g$, and 9$b$. These signals logR, logG, and logB are respectively supplied to adders 11$r$, 11$g$, and 11$b$ through delay circuits 10$r$, 10$g$, and 10$b$. The dynamic range compression coefficient log($\alpha Y^\beta$/Y) obtained by the DGC 8$c$ is then added to each of the signals logR, logG, and logB. As a result, the adders 11$r$, 11$g$, and 11$b$ respectively output:

$$logR + log(\alpha Y^\beta/Y) = logR(\alpha Y^\beta/Y)$$

$$logG + log(\alpha Y^\beta/Y) = logG(\alpha Y^\beta/Y)$$

$$logB + log(\alpha Y^\beta/Y) = logB(\alpha Y^\beta/Y)$$

These output signals are subjected to inverse logarithmic transformation in inverse logarithmic amplifiers 12$r$, 12$g$, and 12$b$. As a result, the following signals are then output through D/A converters 13$r$, 13$g$, and 13$b$, respectively: ($\alpha Y^\beta$/Y)R, ($\alpha Y^\beta$/Y)G, ($\alpha Y^\beta$/Y)B. These signals are signal components which underwent dynamic range compression.

If such a dynamic range adjusting means is used to adjust the dynamic range of an output image signal, a wide range image signal obtained in the above-described manner can be effectively matched with the dynamic range of an external image monitor. As a result, the image signal shown in FIG. 3 can be effectively displayed without causing white omissions or blackening.

In the above embodiment, a nonuniform illuminance component is removed by two-dimensional filtering in the dynamic range control circuit 8, and a luminance signal whose dynamic range is adjusted is subsequently obtained, thereby obtaining a compression coefficient for dynamic range control. However, the dynamic range of a luminance signal can be suppressed within a certain range by only removing a nonuniform illuminance component by the above-mentioned filtering operation.

Figure 7:
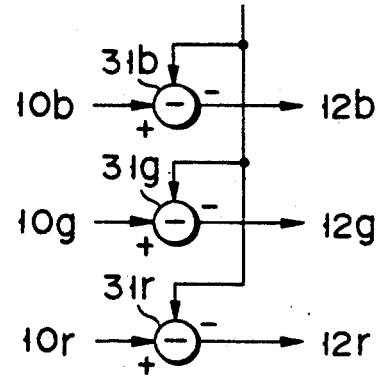

In such a case, therefore, an output from the clip circuit CLIP for adjusting a luminance signal level in the two-dimensional filter 8$b$ may be directly supplied to subtracters 31$r$, 31$g$, and 31$b$ shown in FIG. 7 in place of the adders 11$r$, 11$g$, and 11$b$. That is, since the dynamic range of an image signal can be generally suppressed to 40 to 50 dB by removing a nonuniform illuminance component of a target object, dynamic range adjustment can be fairly effectively performed by using a compression coefficient obtained by the two-dimensional filter 8$b$ without any modifications. In addition, with this arrangement, since the DGC 8$c$ and the like can be omitted, the arrangement of the apparatus can be simplified accordingly.

In the above-described embodiment, a video movie camera is exemplified, which continuously picks up images of a target object every image display period so as to perform image display. Recently, however, various types of electronic still cameras for picking up still images by using the solid-state image pickup element 1 have been developed. For example, while images continuously picked up by a solid-state image pickup element incorporated in an endoscope are monitored, a given image is fetched as a still image and is stored in a mass storage of a digital VTR, a digital video file, or the like.

Figure 8:
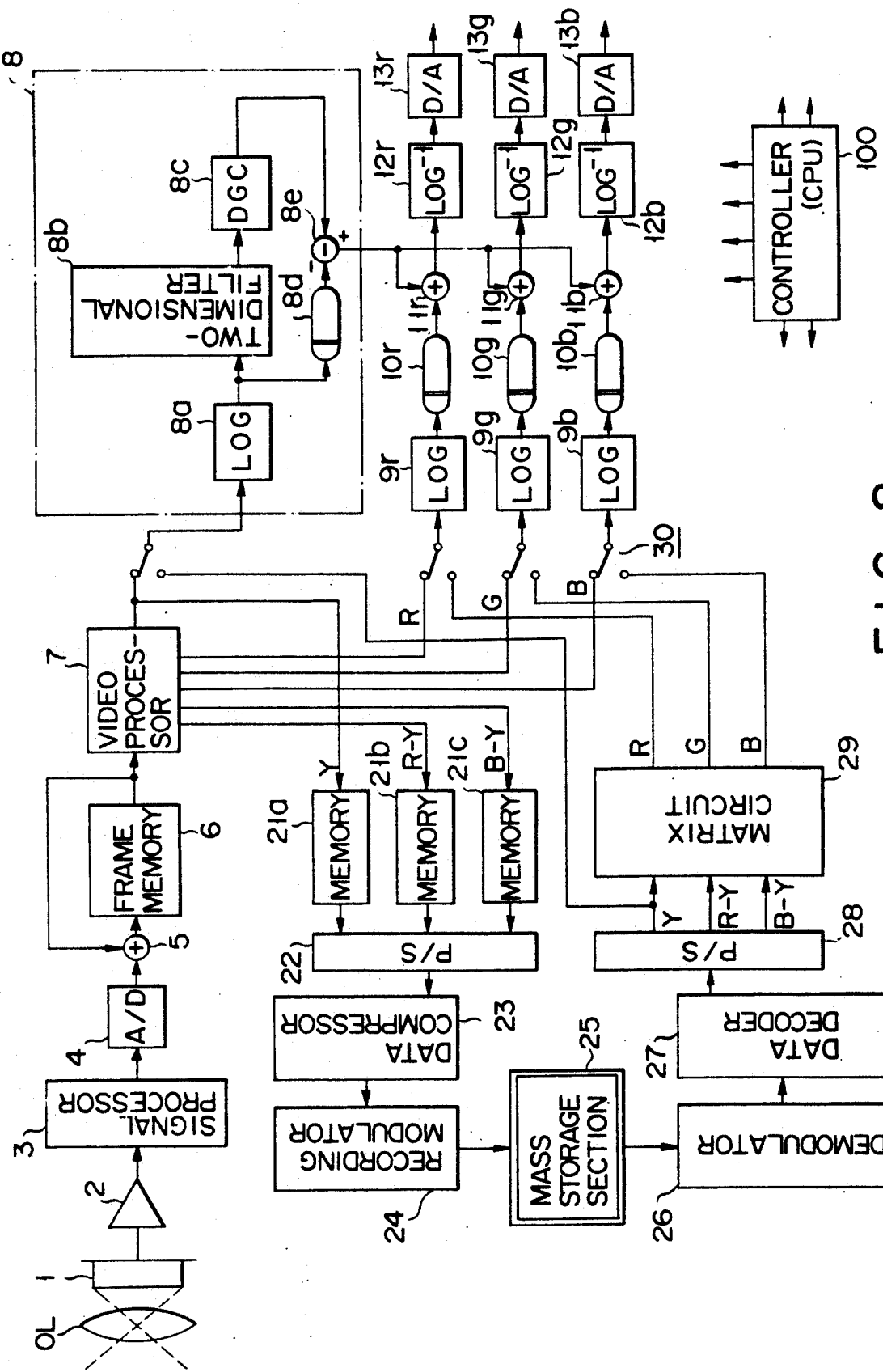

When the present invention is to be applied to such a digital electronic still system, an arrangement of, e.g., the second embodiment shown in FIG. 8 may be employed. The same reference numerals in FIG. 8 denote the same parts as in FIG. 1.

In this embodiment, the processor 7 is used to obtain color difference signals (R−Y) and (B−Y) in addition to the luminance signal component Y and the three primary color signal components R, G, and B. The color difference signals (R−Y) and (B−Y) and the luminance signal Y are supplied to memories 21$a$, 21$b$, and 21$c$ by an amount corresponding to one field in accordance with a release timing. The respective signal components stored in the memories 21$a$, 21$b$, and 21$c$ are sequentially read out through a parallel/serial converter (P/S) 22. The signal components are then subjected to data compression and recording modulation through a series circuit of a data compressor 23 and a recording modulator 24. The signal components processed in this manner are recorded in a mass storage section 25.

An image signal which is read out from the mass storage section 25 to be reproduced is decoded/reproduced through a demodulator 26 and a data decoder 27. The signal is then separated into the color difference signals (R−Y) and (B−Y) and the luminance signal Y described above by a parallel/serial (P/S) converter 28. After this operation, three primary color components R, G, and B are obtained on the basis of the color difference signals (R−Y) and (B−Y) and the luminance signal Y by a matrix circuit 29.

A recording/reproducing section of an image signal has the above-described arrangement. A dynamic range adjusting section similar to the one described above may incorporate a switch circuit 30 for switching whether to process an image signal obtained by the solid-state image pickup element 1 or to process an image signal read out from the mass storage section 25.

According to the second embodiment, a wide dynamic range image signal picked up in the above-described manner can be stored in the mass storage section with high quality as the luminance signal Y and the color difference signals (R−Y) and (B−Y). The wide dynamic range of the recorded/stored image signal can be effectively adjusted to allow the image signal to be displayed on an image monitor.

In each embodiment described above, in order to ensure the dynamic range of an image signal, a noise component of the image signal must be quantized. The required number of quantization bits is about 12. However, a currently available high-speed 12-bit converter, especially, an A/D converter capable of being operated at a TV signal rate, is very expensive. In addition, as a wider frequency band is required with an increase in resolution of an image, an A/D converter having a quantization precision of about 12 bits may become insufficient for the above-described image processing.

In a conventional apparatus, digital image processing is generally performed in 8 bits. Therefore, in the present invention, image signal processing is preferably performed in 8 bits in terms of practical applications.

Figure 9:
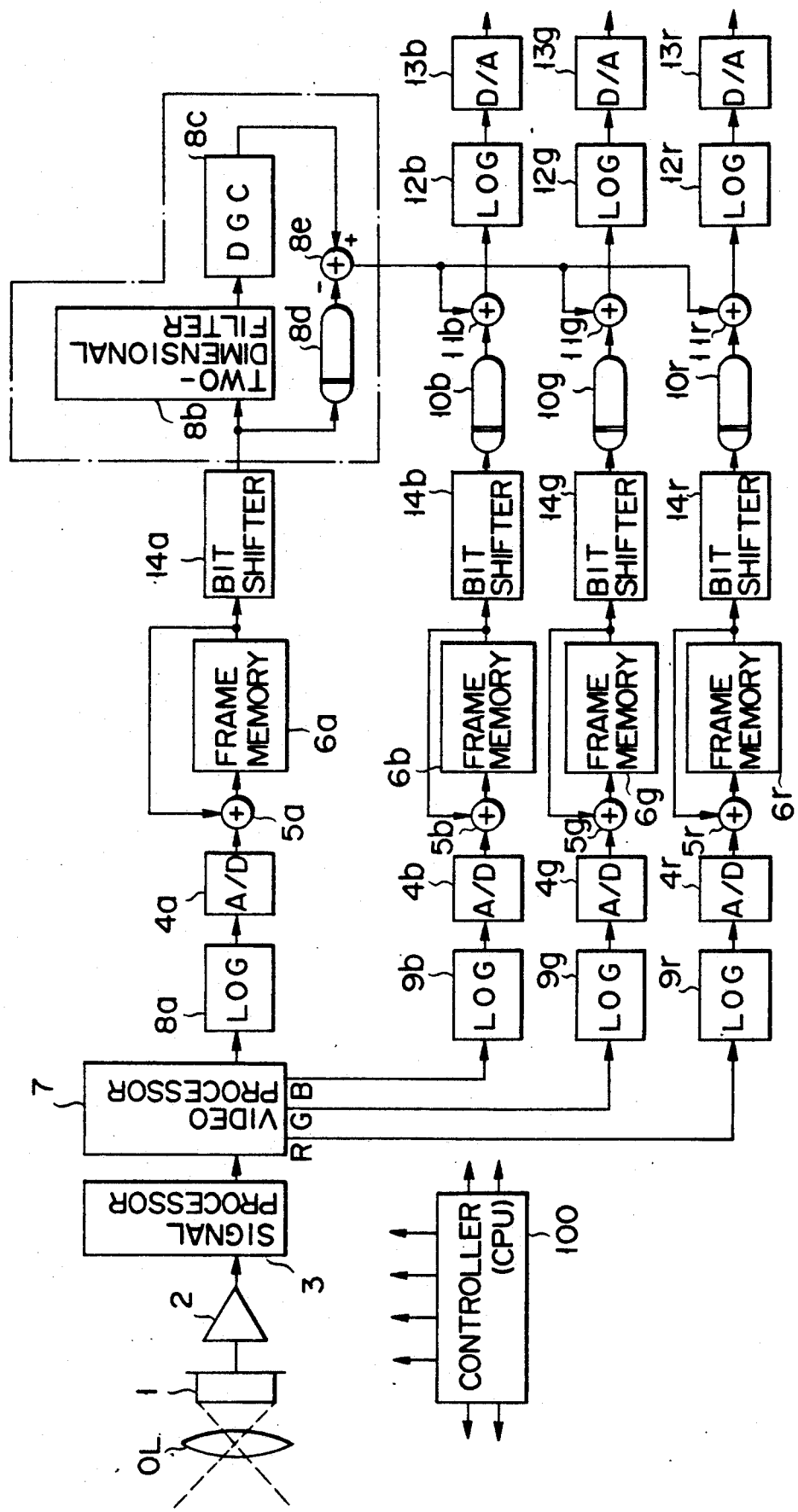

FIG. 9 shows the third embodiment for such image processing, in which an image signal repeatedly read from a solid-state image pickup element 1 at high speed is input to a video processor 7, and the signal is instantly converted into a luminance signal Y and three primary color components R, G, and B, which are then subjected to logarithmic transformation. After these logarithm-transformed signal components are respectively converted into 8-bit digital codes, they are respectively written in frame memories 6a, 6b, 6g, and 6r to be accumulatively added. With this accumulative addition, the dynamic range of each signal component is widened. Since the signal components whose dynamic ranges are widened become, e.g., 12-bit digital signals, they are respectively compressed into 8-bit signals through bit shifters 14a, 14b, 14g, and 14r. After this operation, they are subjected to the above-described dynamic range compression processing.

If a signal processor is designed in this manner, 8-bit signals can be processed by most of its signal systems. This allows formation of an electronic camera apparatus by using currently available general image processor components (semiconductor IC and the like) without modifications. Although a noise component is greatly amplified by a logarithmic amplifier connected to the input terminal of each A/D converter, since the S/N ratio is increased by the above-described accumulative addition, and each image signal subjected to accumulative addition is bit-shifted, the noise component can be suppressed to a very small value. As a result, image display can be performed at a high S/N ratio.

Another example of how the number of quantization bits of an A/D converter is decreased will be described below. In this case, desired digital conversion of an image signal is performed by using, e.g., a previous value predictive coding scheme and an A/D converter having quantization bits smaller in number than a required number of quantization bits.

Figure 10:
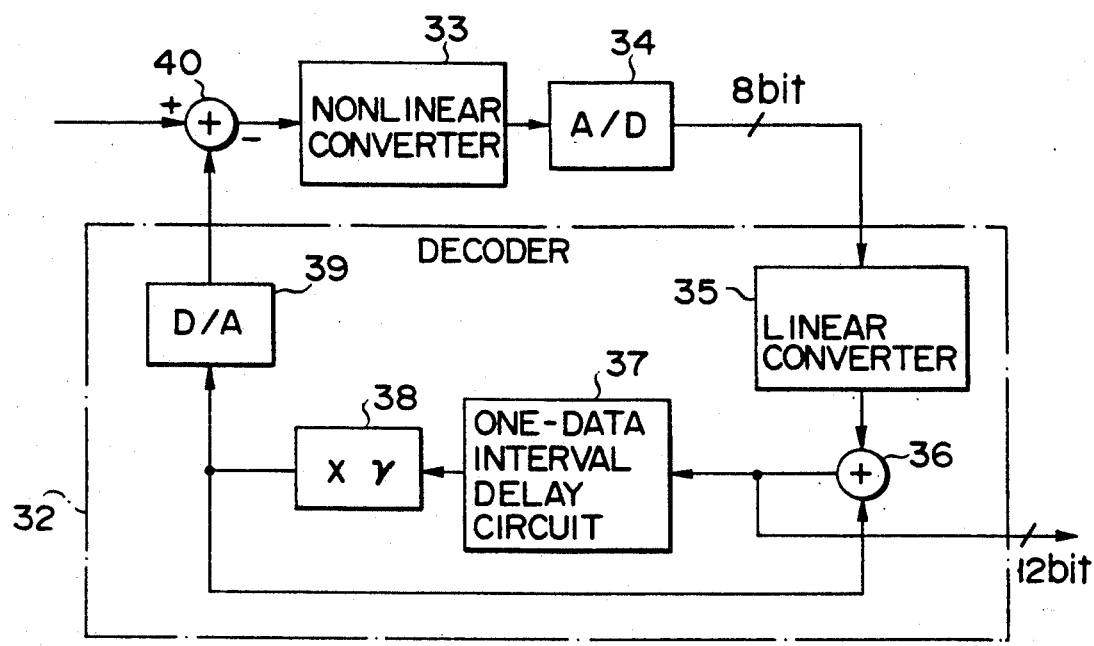
Figure 11:
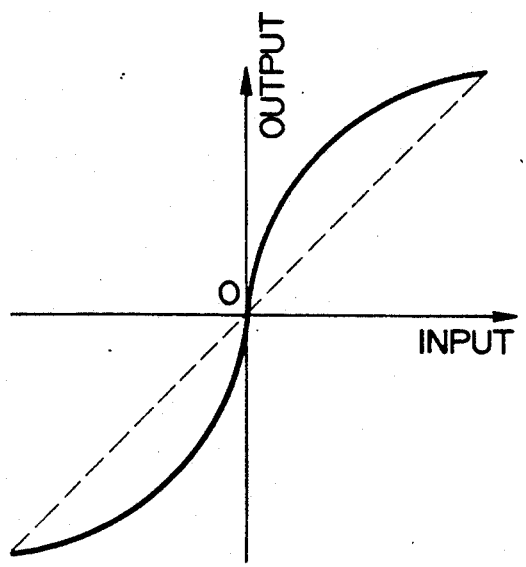

FIG. 10 is a block diagram showing a schematic arrangement of a digital conversion circuit which employs the previous value predictive coding scheme in order to realize 12-bit digital coding by using 8-bit A/D converter. The digital conversion circuit obtains a difference between a current input analog signal and a signal before one (sample) data, generated by a decoder 32, by using an analog subtracter 40 and uses it as a prediction signal. This prediction signal is subjected to nonlinear conversion in a nonlinear converter 33. An output from the nonlinear converter 33 is converted into a digital signal at high speed by a high-speed 8-bit A/D converter 34. In the nonlinear converter 33, prediction signals obtained by the analog subtracter 40 are concentrated near "0". In order to finely sample prediction signal values near "0", a nonlinear conversion characteristic indicated by, e.g., a solid line in FIG. 11 is set.

With such nonlinear conversion, an analog input signal (prediction signal) is converted into an 8-bit digital signal which exhibits high quantization precision near "0" and a lower quantization precision with an increase in value.

Subsequently, the decoder 32 performs linear conversion of the 8-bit digital signal by using a linear converter 35 having input/output characteristics opposite to those of the nonlinear converter 33. With this linear conversion, the quantization precision of the 8-bit digital signal reaches uniformity. This linearly converted digital prediction signal is sequentially added to the value (previous value), output before one (sample) data, by a digital adder 36 and is output as 12-bit data.

Note that the previous value is obtained by delaying an output from the digital adder 36 by one (sample) data interval through a delay circuit 37, and multiplying the output value by a predetermined coefficient $\gamma$ by using a coefficient unit 38. Note that the coefficient $\gamma$ is often give as a value close to "1". If "$\gamma=1$" is set, the coefficient unit 38 can be omitted.

When a previous value (an output value before one data) output from the coefficient unit 38 is fed back to the digital adder 36, a prediction value at a current (sample) data timing is added to the output value before one (sample) data, and the obtained value is output. At the same time, the previous value (the output value before one data) output from the coefficient unit 38 is converted into an analog signal by a D/A converter 39. The analog signal is then supplied to the analog subtracter 40.

In this manner, in the digital conversion circuit shown in FIG. 10, a difference between a value, obtained by analog conversion of a digital conversion result before one (sample) data, and an analog input signal at a current (sample) data timing is obtained as a prediction signal, and nonlinear conversion of the prediction signal is performed, thus performing high-speed digital conversion by using the 8-bit A/D converter 34. The prediction value obtained by this digital conversion is added to the digital conversion result before one (sample) data so as to obtain a digital signal having a desired number of quantization bits (12 bits).

With this arrangement, a digital conversion result with a required number of quantization bits can be obtained by effectively using the inexpensive, high-speed general 8-bit A/D converter 34, and hence image processing in the apparatus in each of the above-described embodiments (also in subsequent embodiments) can be easily realized.

In this case, previous value prediction within a frame is performed as prediction coding. However, even if inter-frame predictive coding or three-dimensional predictive coding, or various types of plane predictive coding other than previous value predictive coding may be properly employed, digital conversion with a required number of quantization bits, e.g., formation of, e.g., 12-bit digital signal, can be realized by using the inexpensive, high-speed 8-bit A/D converter 34.

Figure 12:
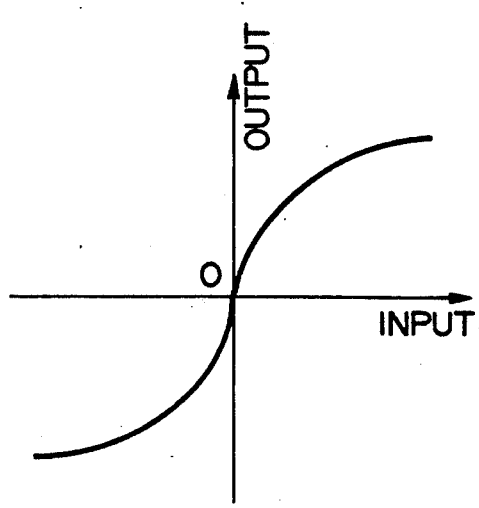

Note that the present invention is not limited to the above-described embodiments. For example, in each embodiment described above, an image signal is converted into three primary color components R, G, and B, and dynamic range adjustment is subsequently performed. However, dynamic range adjustment may be performed after an image signal is separated into three complementary color components (yellow, magenta, and cyan). In addition, dynamic range adjustment may be performed with respect to color difference signals (R−Y) and (B−Y). In this case, since the color difference signals (R−Y) and (B−Y) have positive and negative polarities, a logarithmic amplifier for logarithm-converting these signals must have a characteristic shown in, e.g., FIG. 12. Furthermore, the number of times of repetitive read operations of image signals from the solid-state image pickup element 1, the dynamic range adjusting means, and the like may be variously modified in accordance with specifications. That is, various changes and modifications can be made within the spirit and scope of the invention.

If accumulative addition is performed to obtain a wide dynamic range image signal as in the respective embodiments described above, although a random noise component in an image signal is reduced in relation to a signal component, a fixed pattern noise of an image pickup element and a fixed pattern noise generated in a signal processor including a clamp circuit (the two types of noise components will be collectively referred to as an FPN component hereinafter) are multiplied and increased, similar to the signal component. As a result, the FPN component becomes more conspicuous as the random noise component is reduced.

The fourth embodiment of the present invention, designed to reduce such an FPN component, will be described below.

Figure 13:
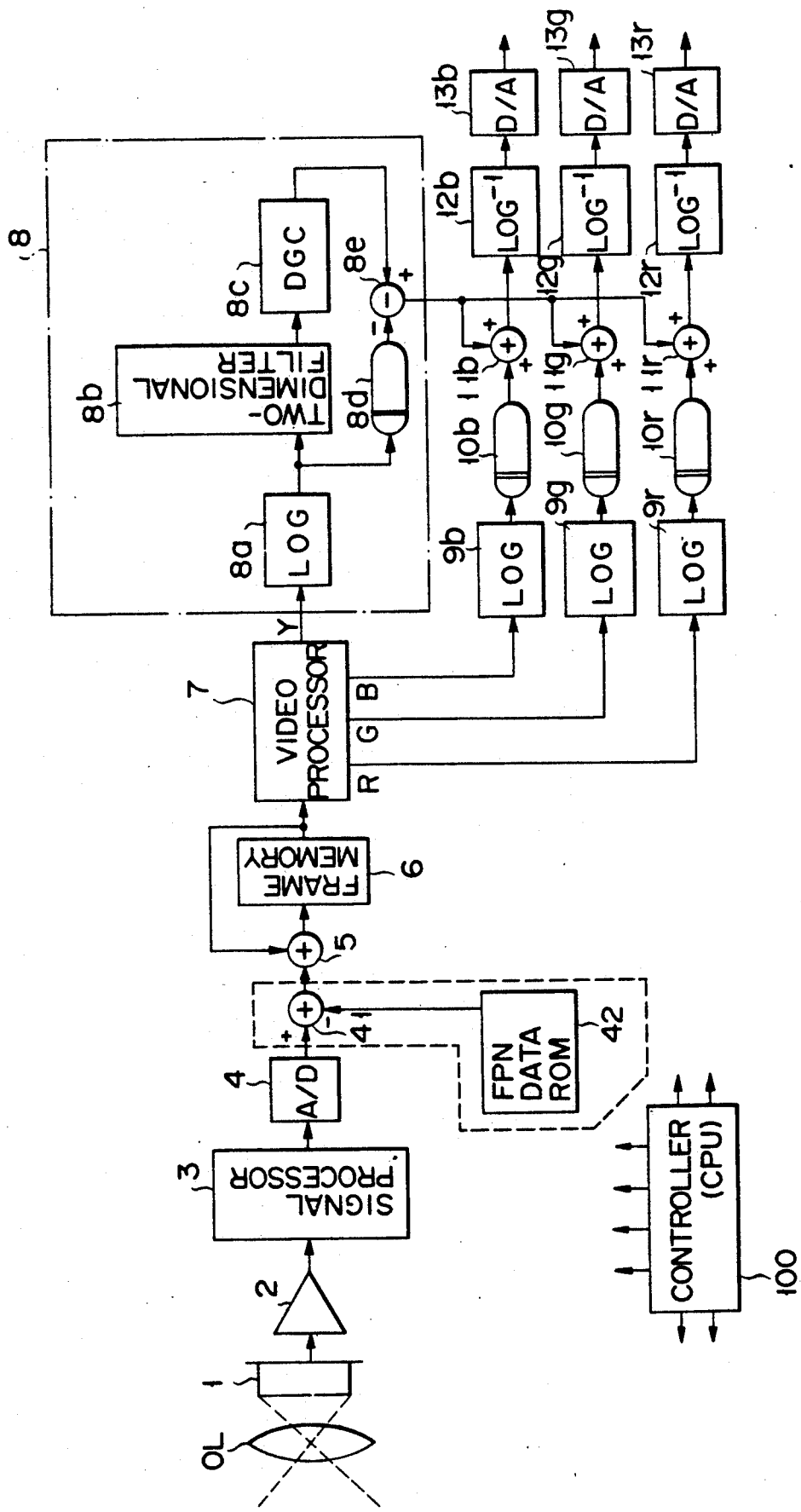

FIG. 13 shows the fourth embodiment of the present invention which is equivalent to the first embodiment to which a means for reducing an FPN component is added.

The same reference numerals in the following embodiment denote the same parts as in the embodiments described above, and a description thereof will be omitted. In this embodiment, data obtained by A/D-converting an FPN component including background noise components generated in a solid-state image pickup element 1, an amplifier 2, and a signal processor 3 is recorded in an FPN data ROM 42. The FPN data ROM 42 can store data having the same number of pixels as that of data stored in the frame memory 6. In image pickup processing, after an input signal is A/D-converted, FPN data of corresponding piles is read out from the FPN data ROM 42, and the FPN data is sequentially subtracted from the input signal by a subtracter 41, thus performing accumulative addition of the signals, from which the FPN component is subtracted, by using an adder 5 and the subsequent units.

Since the FPN component is subtracted from the input signal, only the random noise component is left in the input signal. Thereafter, the random noise component is also reduced by accumulative addition. Therefore, a high-quality image signal having a wide dynamic range and a high S/N ratio can be obtained. With this processing, inconvenience such as vertical stripes, on a display screen, caused by an FPN component can be eliminated.

In the fourth embodiment, data of an FPN component including background noise components is stored in the ROM 42 in advance. FIG. 14 shows the fifth embodiment of the present invention wherein such FPN data can be arbitrarily stored.

This embodiment includes switches 45 and 46 for switching a photographic mode and an FPN storage mode, and an FPN shutter 47. In the photographic mode, the switch 45 connected to the output terminal of a frame memory 6 is connected to a video processor 7, while the switch 46 connected to on side of a subtracter 41 is set in an ON state, and the FPN shutter 47 arranged in front of a solid-state image pickup element 1 is set in an open state. When a photographing operation is to be performed, previously stored FPN data is read out from an FPN frame memory 43 and is subtracted from an input signal by the subtracter 41. Thereafter, the signal obtained by subtracting the FPN component from the input signal is accumulatively added by an adder 5 and the frame memory 6.

In the FPN storage mode, the switch 45 is connected to a 1/n-multiplier 44, while the switch 46 is set in an OFF state, and the FPN shutter 47 is in a closed state. Note that the switches 45 and 46 and the FPN shutter 47 are designed to be operated in synchronism with each other. When FPN data is stored, the FPN storage mode is set to shut external light. Therefore, noise components (including FPN and random noise components) generated in a solid-state image pickup element 1, an amplifier 2, and a signal processor 3 are converted into digital signals by an A/D converter 4. The digital signals are then accumulatively added by an adder 5 and the frame memory 6. As a result, the random noise is reduced, and the FPN component is emphasized. Accumulative addition is performed n times to reduce the random noise component to a value sufficiently smaller than the FPN component. The level of the FPN data is restored to the level before accumulative addition by the 1/n-multiplier 44. The FPN data is then stored in the FPN frame memory 43.

According to this embodiment even if an FPN component is changed with a change in temperature, since image pickup processing is performed after the FPN component is re-stored, a wide dynamic range image signal having a high S/N ratio can be obtained. Since an FPN component, especially an FPN component of an image pickup element such as a CCD, is changed by as large as 6 dB at 10° C., this embodiment is effective. In addition, the present invention can be effectively applied to a case wherein an FPN component is changed with a change in characteristics, over time, of an element arranged in a signal path extending from the solid-state image pickup element 1 to the A/D converter 4.

If the accumulative addition count n is set to be an integer square of 2, the 1/n-multiplier 44 can be replaced with a bit shifter. This further simplifies the arrangement of the apparatus. Furthermore, in this embodiment, since an FPN component is stored after it is multiplied by 1/n, and an FPN component is subtracted before accumulative addition in image pickup processing, the capacity of the FPN frame memory can be reduced, and the preset value of the addition count n can be changed in both the FPN storage mode and the photographic mode.

When this embodiment is to be applied to a video movie camera, the function of the FPN shutter 47 can be replaced by a closing operation of a diaphragm. When this embodiment is to be applied to a still video camera, since a normal shutter can also serve as an FPN shutter, no special FPN shutter is required. If the apparatus of this embodiment is designed such that the FPN storage mode is automatically set when the power source is turned on, and the photographic mode is set after FPN data is stored, the apparatus can be operated in the same manner as a conventional video movie camera and a still video camera. Assume that this embodiment is applied in a place where environmental conditions such as temperatures are greatly changed. If the embodiment is applied to a video movie camera, FPN data is updated in units of several to several tens frames. If it is applied to a still video camera, such updating is performed immediately before each shutter release operation. With this operation, an FPN component can be reliably reduced, and hence an image signal having a high S/N ratio can always be obtained.

The embodiments shown in FIGS. 13 and 14 are associated with the case wherein FPN components are included in an additional manner. If, however, FPN components are included in a multiple manner, the same effect as described above can be obtained by replacing the subtracter 41 in FIGS. 13 and 14 with a divider 50 in FIG. 15A.

FIG. 15B shows a modification for reducing noise. FIG. 15B shows a part of the arrangement in FIG. 1. This modification additionally includes a cooling unit 48 which is thermally coupled to the solid-state image pickup element 1, the amplifier 2, the signal processor 3, and the A/D converter 4 so as to cool them. A dark current in the solid-state image pickup element 1 is greatly reduced by the cooling unit 48. In addition, thermal noise components respectively generated by the amplifier 2, the signal processor 3, and the A/D converter 4 can be reduced. Since a fixed pattern noise component based on a nonuniform dark current in the solid-state image pickup element 1 is reduced, both an FPN component and a random noise component can be effectively reduced. With this reduction in noise, an addition count in the subsequent accumulative addition circuit can be decreased, thus realizing high-speed processing and providing advantageous effects in terms of time. If this modification is combined with the fourth embodiment shown in FIG. 14, an FPN component can be greatly reduced, thus providing an advantageous effect that the number of bits of the FPN frame memory 43 per pixel is decreased.

Note that noise reducing circuits enclosed by dotted lines in FIGS. 13 and 14 can be respectively arranged in corresponding portions in FIGS. 8 and 9.

As has been described above, according to the present invention, the dynamic range of an image signal picked up by a solid-state image pickup element can be very easily and effectively widened. In addition, a fixed pattern noise can be reduced, and a target object having a wide dynamic range can be effectively picked up. Furthermore, an S/N ratio increasing effect can be obtained, thus providing various effects in practical applications.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic camera apparatus for providing an image pickup signal to serve an image display by an image monitor, said apparatus comprising:
   image pickup means, having at least a solid-state image pickup element, for generating an image signal by electronically picking up an image of a target object to be photographed;
   control means for time-divisionally and repeatedly executing image pickup processing of the target object a plurality of times by using said image pickup means and a read operation of the image signal obtained by the image pickup processing;
   accumulative addition means for sequentially performing accumulative addition of the image signals repeatedly read from said image pickup means by said control means; and
   processing means for processing the image signal obtained by said accumulative addition means upon sequential, accumulative addition so as to allow the image signal to be used for an image display by said image monitor;
   said processing means including dynamic range control means for controlling a dynamic range of the image signal obtained by said accumulative addition means upon sequential, accumulative addition;
   said dynamic range control means including:
   means for logarithmically-compressing the image signal obtained by said accumulative addition means upon sequential, accumulative addition; and
   means for removing a non-uniform illuminance component from said image signal.

2. An apparatus according to claim 1, wherein said image pickup means includes an optical lens for focusing the target object, and a solid-state image pickup element for generating an image signal of the target object focused by said optical lens, said solid-state image pickup element allowing the image signal to be read therefrom.

3. An apparatus according to claim 1, wherein said accumulative addition means includes an A/D converter for converting the image signal, repeatedly read from said image pickup means by said control means, into a digital signal, and a frame memory and an adder for accumulatively adding the digital signal from said A/D converter.

4. An apparatus according to claim 1, wherein said dynamic range control means includes means for matching the dynamic range of the image signal with that of said image monitor.

5. An apparatus according to claim 1, wherein said dynamic range control means includes means for controlling a dynamic range of a luminance signal included in the image signal.

6. An apparatus according to claim 1, wherein said apparatus includes a video movie camera.

7. An apparatus according to claim 1, wherein said apparatus includes a still video camera.

8. An apparatus according to claim 1, wherein said processing means includes means for converting a processing system for the image signal from a 12-bit processing system to an 8-bit processing system.

9. An apparatus according to claim 1, wherein said processing means includes means for converting a processing system for the image signal from an 8-bit processing system to a 12-bit processing system.

10. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for repeatedly executing image pickup processing of the target object a plurality of times within one period of an image display by said image monitor by using said image pickup means and a read operation of the image signal obtained by the image pickup processing;

accumulative addition means for sequentially performing accumulative addition of the image signals, repeatedly read from said image pickup means by said control means, a plurality of time within one period of an image display by said image monitor; and processing means for processing the image signal obtained by said accumulative addition means upon sequential, accumulative addition so as to allow the image signal to be used for an image display by said image monitor;

said processing means including dynamic range control means for controlling a dynamic range of the image signal obtained by said accumulative addition means upon sequential, accumulative addition;

said dynamic range control means including:

means for logarithmically-compressing the image signal obtained by said accumulative addition means upon sequential, accumulative addition; and means for removing a non-uniform illuminance component from said image signal.

11. An apparatus according to claim 10, wherein said image pickup means includes an optical lens for focusing the target object, and a solid-state image pickup element for generating an image signal of the target object focused by said optical lens, said solid-state image pickup element allowing the image signal to be read therefrom at a high speed relative to one period of an image display by said image monitor.

12. An apparatus according to claim 10, wherein said accumulative addition means includes an A/D converter for converting the image signal, repeatedly read from said image pickup means by said control means, into a digital signal, and a frame memory and an adder for accumulatively adding the digital signal from said A/D converter.

13. An apparatus according to claim 9, wherein said dynamic range control means includes means for matching the dynamic range of the image signal with that of said image monitor.

14. An apparatus according to claim 9, wherein said dynamic range control means includes means for controlling a dynamic range of a luminance signal included in the image signal.

15. An apparatus according to claim 10, wherein said apparatus includes a video movie camera.

16. An apparatus according to claim 10, wherein said apparatus includes a still video camera.

17. An apparatus according to claim 10, wherein said processing means includes means for converting a processing system for the image signal from a 12-bit processing system to an 8-bit processing system.

18. An apparatus according to claim 10, wherein said processing means includes means for converting a processing system for the image signal from an 8-bit processing system to a 12-bit processing system.

19. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using said image pickup means and a read operation of the image signal obtained by the image pickup processing;

reducing means for reducing a fixed pattern noise signal included in the image signal repeatedly read from said image pickup means by said control means;

accumulative addition means for sequentially performing accumulative addition of the image signal in which the fixed pattern noise signal is reduced by said reducing means; and processing means for processing the image signal obtained by said accumulative addition means upon sequential, accumulative addition so as to allow the image signal to be used for an image display by said image monitor;

said processing means including dynamic range control means for controlling a dynamic range of the image signal obtained by said accumulative addition means upon sequential, accumulative addition;

said dynamic range control means including:

means for logarithmically-compressing the image signal obtained by said accumulative addition means upon sequential, accumulative addition; and means for removing a non-uniform illuminance component from said image signal.

20. An apparatus according to claim 19, wherein said image pickup means includes an optical lens for focusing the target object, and a solid-state image pickup element for generating an image signal of the target object focused by said optical lens, said solid-state image pickup element allowing the image signal to be read therefrom.

21. An apparatus according to claim 19, wherein said accumulative addition means includes an A/D converter for converting the image signal, in which the fixed pattern noise signal is reduced by said reducing means, into a digital signal, and a frame memory and an adder for accumulatively adding the digital signal from said A/D converter.

22. An apparatus according to claim 19, wherein said apparatus includes a video movie camera.

23. An apparatus according to claim 19, wherein said apparatus includes a still video camera.

24. An apparatus according to claim 19, wherein said processing means includes means for converting a processing system for the image signal from a 12-bit processing system to an 8-bit processing system.

25. An apparatus according to claim 19, wherein said processing means includes means for converting a processing system for the image signal from an 8-bit processing system to a 12-bit processing system.

26. An apparatus according to claim 19, wherein said dynamic range control means includes means for matching the dynamic range of the image signal with that of said image monitor.

27. An apparatus according to claim 19, wherein said dynamic range control means includes means for controlling a dynamic range of a luminance signal included in the image signal.

28. An apparatus according to claim 19, wherein said reducing means includes a memory for storing a fixed pattern noise signal, and calculation means for subtracting the fixed pattern noise signal from the image signal read from said solid-state image pickup element or dividing the image signal by the fixed pattern noise signal.

29. An apparatus according to claim 19, wherein said reducing means includes cooling means for cooling at least said solid-state image pickup element.

30. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using said image pickup means and a read operation of the image signal obtained by the image pickup processing;

accumulative addition means for sequentially performing accumulative addition of the image signals repeatedly read from said image pickup means by said control means; and processing means for processing the image signal obtained by said accumulative addition means upon sequential, accumulative addition so as to allow the image signal to be used for an image display by said image monitor;

said processing means including means for converting a processing system for the image signal from a 12-bit processing system to an 8-bit processing system.

31. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using said image pickup means and a read operation of the image signal obtained by the image pickup processing;

accumulative addition means for sequentially performing accumulative addition of the image signals repeatedly read from said image pickup means by said control means; and processing means for processing the image signal obtained by said accumulative addition means upon sequential, accumulative addition so as to allow the image signal to be used for an image display by said image monitor;

said processing means including means for converting a processing system for the image signal from an 8-bit processing system to a 12-bit processing system.

32. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for repeatedly executing image pickup processing of the target object a plurality of times within one period of an image display by said image monitor by using said image pickup means and a read operation of the image signal obtained by the image pickup processing;

accumulative addition means for sequentially performing accumulative addition of the image signals, repeatedly read from said image pickup means by said control means, a plurality of time within one period of an image display by said image monitor; and processing means for processing the image signal obtained by said accumulative addition means upon sequential, accumulative addition so as to allow the image signal to be used for an image display by said image monitor;

said processing means including means for converting a processing system for the image signal from an 12-bit processing system to an 8-bit processing system.

33. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for repeatedly executing image pickup processing of the target object a plurality of times within one period of an image display by said image monitor by using said image pickup means and a read operation of the image signal obtained by the image pickup processing;

accumulative addition means for sequentially performing accumulative addition of the image signals, repeatedly read from said image pickup means by said control means, a plurality of time within one period of an image display by said image monitor; and processing means for processing the image signal obtained by said accumulative addition means upon sequential, accumulative addition so as to allow the image signal to be used for an image display by said image monitor;

said processing means including means for converting a processing system for the image signal from an 8-bit processing system to a 12-bit processing system.

34. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using said image pickup means and a read operation of the image signal obtained by the image pickup processing;

reducing means for reducing a fixed pattern noise signal included in the image signal repeatedly read from said image pickup means by said control means;

accumulative addition means for sequentially performing accumulative addition of the image signal in which the fixed pattern noise signal is reduced by said reducing means; and processing means for processing the image signal obtained by said accumulative addition means upon sequential, accumulative addition so as to allow the image signal to be used for an image display by said image monitor;

said processing means including means for converting a processing system for the image signal from an 12-bit processing system to a 8-bit processing system.

35. An electronic camera apparatus for providing an image pickup signal to serve an image display by an image monitor, said apparatus comprising:

image pickup means, having at least a solid-state image pickup element, for generating an image signal by electronically picking up an image of a target object to be photographed;

control means for time-divisionally and repeatedly executing image pickup processing of the target object a plurality of times by using said image pickup means and a read operation of the image signal obtained by the image pickup processing;

reducing means for reducing a fixed pattern noise signal included in the image signal repeatedly read from said image pickup means by said control means;

accumulative addition means for sequentially performing accumulative addition of the image signal in which the fixed pattern noise signal is reduced by said reducing means; and processing means for processing the image signal obtained by said accumulative addition means upon sequential, accumulative addition so as to allow the image signal to be used for an image display by said image monitor;

said processing means including means for converting a processing system for the image signal from an 8-bit processing system to a 12-bit processing system.

* * * * *